United States Patent [19]

Sherwood

[11] Patent Number: 4,792,198
[45] Date of Patent: Dec. 20, 1988

[54] METHOD AND APPARATUS FOR ROTATING ONE OR MORE MIRRORS IN A BEAM SCANNING SYSTEM

[75] Inventor: Gregory J. Sherwood, Silver Spring, Md.

[73] Assignee: Spectra-Physics, Inc., San Jose, Calif.

[21] Appl. No.: 64,318

[22] Filed: Jun. 18, 1987

[51] Int. Cl.⁴ ............................................... G02B 26/10
[52] U.S. Cl. ..................................... 350/6.7; 350/6.5; 350/582; 350/583
[58] Field of Search .................... 350/6.1, 6.5, 6.6, 6.7, 350/6.8, 6.9, 6.91, 582, 583; 384/397–403

[56] References Cited

U.S. PATENT DOCUMENTS

| | | | |
|---|---|---|---|
| 4,154,507 | 5/1979 | Barr | 350/6.9 |
| 4,367,912 | 1/1983 | Kitamura | 350/6.8 |
| 4,512,626 | 4/1985 | Kamiya et al. | 350/6.8 |
| 4,609,251 | 9/1986 | Nakaoka et al. | 350/6.8 |
| 4,623,216 | 11/1986 | Sato et al. | 350/6.8 |

*Primary Examiner*—John K. Corbin
*Assistant Examiner*—Ronald M. Kachmarik
*Attorney, Agent, or Firm*—Killworth, Gottman, Hagan & Schaeff

[57] ABSTRACT

A method and apparatus for rotating one or more mirrors in a beam scanning system includes a drive motor, a drive spindle, operatively connected to the drive motor, for rotation by the motor, a spindle support arrangement, and a mirror support wheel mounted on the spindle for rotation therewith. The spindle support arrangement includes a generally cylindrical spindle housing and a bearing mounted within the housing a predetermined distance from an open end thereof. The spindle extends through the spindle housing and the bearing and out of the open end of the spindle housing. The mirror support wheel defines a generally annular counter bore for receiving the open end of the spindle housing thereinto. The mirror support wheel further defines a central spindle engaging portion which is radially inward of the annular counter bore, the central spindle engaging portion has an inner surface facing the bearing and spaced therefrom by a distance which is sufficient to substantially reduce the Bernoulli effect pressure drop in the region within the spindle housing adjacent the side of the bearing facing the inner surface when the mirror support wheel is rotated by the spindle. The inner surface of the central spindle engaging portion of the mirror support wheel may be spaced from the bearing by a distance of approximately 0.200 inches.

14 Claims, 1 Drawing Sheet

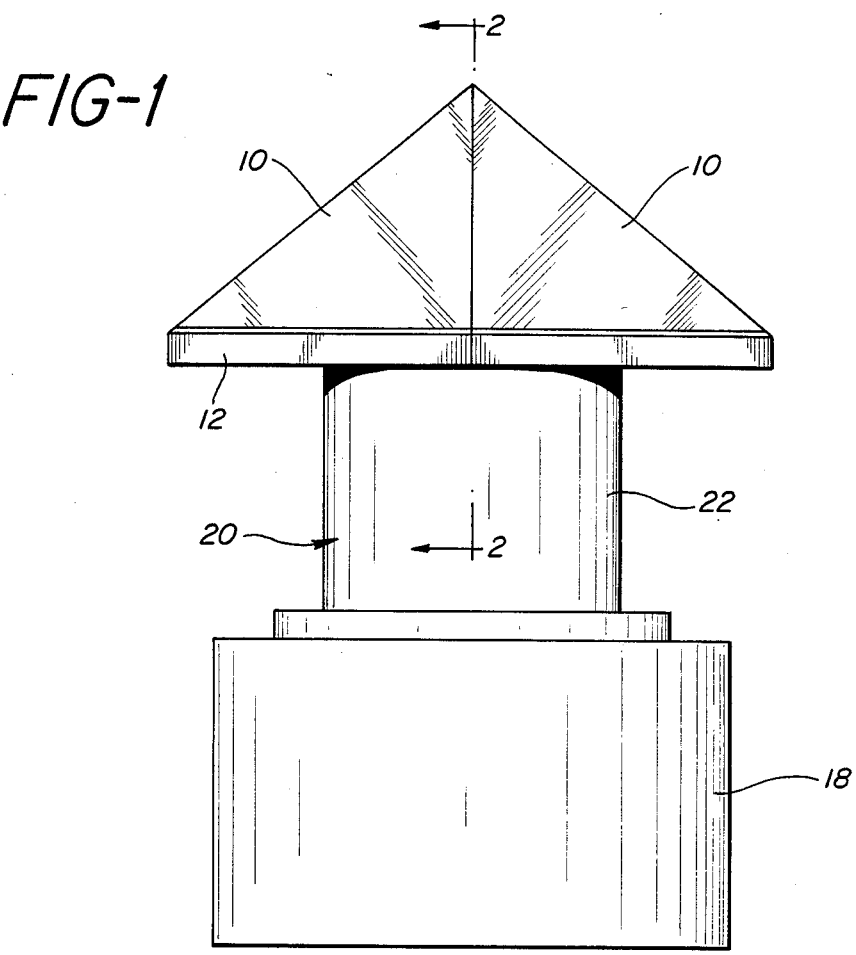
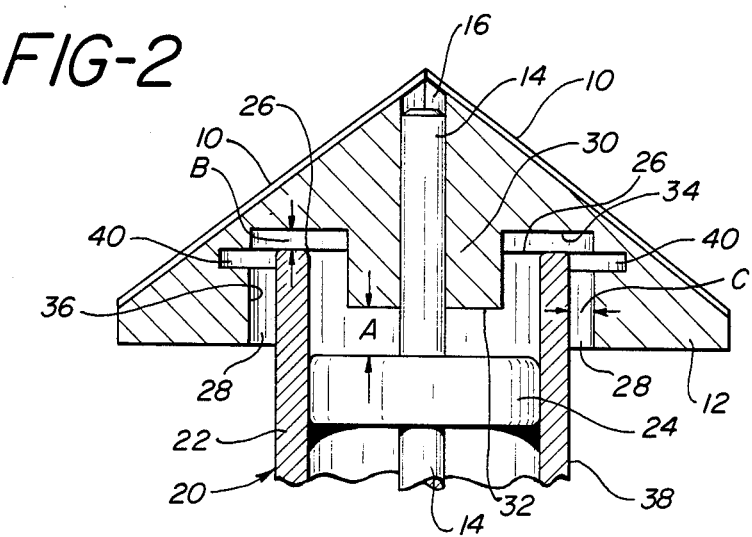

METHOD AND APPARATUS FOR ROTATING ONE OR MORE MIRRORS IN A BEAM SCANNING SYSTEM

Background of the Invention

The present invention relates to a beam scanning system including one or more rotating mirrors and, more particularly to an apparatus and method in which the mirrors are rotated with reduced risk of contamination of system optics by oil leaking from the mirror support bearings.

In many prior art beam scanning systems it is common to mount one or more mirrors on a mirror support wheel and to rotate the wheel in the path of the beam. This effects a repeated sweeping of the reflected beam through a desired path. Such scanning arrangements may be utilized, for example, in laser beam scanning systems of the type which are used to read bar codes of various types on product labels.

The scanning wheel is mounted on a drive spindle which is rotated at a relatively high speed, on the order of 6000 RPM, to effect scanning of the beam. The drive spindle is supported by one or more bearings and is driven by an electric motor. In the past is has been found that some of the lubricant oil from the spindle bearing may leak from the bearing over a period of time. When such leakage occurs, the oil may find its way onto the rapidly rotating mirror support wheel or other parts of the rotating structure and then be thrown from the wheel by the effects of centripetal force. If the oil is deposited on any of the mirrors or lenses which commonly make up a beam scanning system, the oil will result in significant degradation of the performance of the scanning system.

To try to reduce the amount of oil inadvertently deposited on the scanning system optics, prior art scanning systems have enclosed the bearing and spindle in an annular spindle housing, the open end of which extended into a counter bore in the support wheel. To further reduce the risk of oil leakage, one or more annular grooves have been machined into the side wall of the counter bore which faces the outer surface of the annular spindle housing. These grooves act in the manner of a labyrinth seal so as to trap within the grooves any oil which may actually leak from the bearing and prevent it from migrating to a portion of the support wheel where it might be thrown outward onto adjacent lenses or mirrors.

It has been found that an unacceptably high incidence of oil leakage has occurred even with the spindle housing and labyrinth seal arrangement described above. Accordingly, a need exists for an improved apparatus and method for rotating one or more mirrors in a beam scanning system in which the deleterious effects of oil leakage are substantially reduced.

Summary of the Invention

This need is met by an apparatus and a method according to the present invention. The apparatus for rotating one or more mirrors in a beam scanning system, comprises: a drive motor, a drive spindle, operatively connected to the drive motor, for rotation by the motor, a spindle support arrangement, and a mirror support wheel mounted on the spindle for rotation therewith. The spindle support arrangement includes a generally cylindrical spindle housing and a bearing mounted within the housing a predetermined distance from an open end thereof. The spindle extends through the spindle housing and the bearing and out of the open end of the spindle housing. The mirror support wheel defines a generally annular counter bore for receiving the open end of the spindle housing thereinto. The mirror support wheel further defines a central spindle engaging portion which is radially inward of the annular counter bore, the central spindle engaging portion has an inner surface facing the bearing and spaced therefrom by a distance which is sufficient to substantially reduce the Bernoulli effect pressure drop in the region within the spindle housing adjacent the side of the bearing facing the inner surface when the mirror support wheel is rotated by the spindle. The inner surface of the central spindle engaging portion of the mirror support wheel may be spaced from the bearing by a distance of approximately 0.200 inches.

The open end of the spindle housing is spaced from the bottom of the annular counter bore by a distance which is sufficient to substantially reduce the Bernoulli effect pressure drop in the region within the spindle housing adjacent the side of the bearing facing the inner surface when the mirror support wheel is rotated by the spindle. The open end of the spindle housing may be spaced from the bottom of the annular counter bore by approximately 0.040 inches.

The mirror support wheel may define one or more annular recesses in the side surface of the counter bore facing the outer surface of the spindle housing, whereby the one or more annular recesses define one or more labyrinth seals in conjunction with the outer surface of the spindle housing.

The side surface of the counter bore facing the outer surface of the spindle housing is spaced therefrom by a distance which is sufficient to substantially reduce the Bernoulli effect pressure drop in the region within the spindle housing adjacent the side of the bearing facing the inner surface when the mirror support wheel is rotated by the spindle. The side surface of the counter bore facing the outer surface of the spindle housing is spaced therefrom by approximately 0.075 inches.

The method, according to the present invention, for rotating one or more mirrors in a beam scanning system, comprises the steps of:

a. providing a drive spindle, b. supporting the drive spindle by means of a spindle support arrangement, including a generally cylindrical spindle housing and a bearing mounted within the housing a predetermined distance from an open end thereof, the spindle extending through the spindle housing and the bearing and out of the open end of the spindle housing, c. mounting a mirror support wheel on the spindle for rotation therewith, the mirror support wheel defining a generally annular counter bore for receiving the open end of the spindle housing thereinto, the mirror support wheel further defining a central spindle engaging portion which is radially inward of the annular counter bore, the central spindle engaging portion having an inner surface facing the bearing and spaced therefrom by a distance which is sufficient to substantially reduce the Bernoulli effect pressure drop in the region within the spindle housing adjacent the side of the bearing facing the inner surface which would otherwise be produced when the mirror support wheel is rotated by the spindle.

d. mounting a plurality of mirrors on the mirror support wheel, and e. rotating the drive spindle and the mirror support wheel.

The inner surface of the central spindle engaging portion of the mirror support wheel may be spaced from the bearing by a distance of approximately 0.200 inches.

The open end of the spindle housing is spaced from the bottom of the annular counter bore by a distance which is sufficient to substantially reduce the Bernoulli effect pressure drop in the region within the spindle housing adjacent the side of the bearing facing the inner surface when the mirror support wheel is rotated by the spindle. The open end of the spindle housing may be spaced from the bottom of the annular counter bore by approximately 0.040 inches.

The mirror support wheel defines one or more annular recesses in the side surface of the counter bore facing the outer surface of the spindle housing, whereby the one or more annular recesses define one or more labyrinth seals in conjunction with the outer surface of the spindle housing.

The side surface of the counter bore facing the outer surface of the spindle housing is spaced therefrom by a distance which is sufficient to substantially reduce the Bernoulli effect pressure drop in the region within the spindle housing adjacent the side of the bearing facing the inner surface when the mirror support wheel is rotated by the spindle. The side surface of the counter bore facing the outer surface of the spindle housing may be spaced therefrom by approximately 0.075 inches.

Accordingly, it is an object of the present invention to provide an apparatus and method for rotating one or more mirrors in a beam scanning system in which the deleterious effects of oil leakage from a bearing arrangement are reduced; to provide such an apparatus and method in which the mirrors are mounted on a mirror support wheel, with the wheel being rotated by a spindle extending through the bearing, and with sufficient spacing between the bearing and the wheel to substantially reduce the Bernoulli effect pressure drop which would otherwise be produced by the wheel rotating in close proximity to the bearing: and to provide such an apparatus and method that the spacing between the wheel and a spindle housing which surrounds the bearing and the spindle is sufficient to substantially reduce the Bernoulli effect pressure drop which would otherwise be produced by the rotation of the wheel in close proximity to the spindle housing.

Other objects and advantages of the invention will be apparent from the following description, the accompanying drawings and the appended claims.

BRIEF DESCRIPTION OF THE DRAWINGS

FIG. 1 is a side view of the apparatus according to the present invention for rotating one or more mirrors in a beam scanning system; and FIG. 2 is a partial sectional view, taken generally along line 2—2 in FIG. 1.

DETAILED DESCRIPTION OF THE PREFERRED EMBODIMENT

Reference is made to FIGS. 1 and 2 which illustrate apparatus for rotating a plurality of mirrors 10 according to the present invention. Such a mirror rotation arrangement is intended to be incorporated in a beam scanning system in which the beam strikes each mirror in turn as the mirrors are rotated into the beam path, such that the beam is caused to repetitively sweep through a desired arc. Toward this end, the mirrors 10 are attached to a support wheel 12 which is mounted on a drive spindle 14. Four such mirrors are illustrated in a pyramid configuration, but the present invention is equally applicable to the rotation of any number of mirrors in a beam scanning system. Mirrors 10 may be adhesively mounted on wheel 12 and spindle 14 may be adhesively secured to wheel 12 in bore 16. A drive motor 18, preferably a small, electrical servo motor, is operatively connected to the drive spindle 14, either directly or by an intermediary drive gear arrangement, to rotate the spindle 14 and the wheel 12.

A spindle support arrangement 20 includes a generally cylindrical spindle housing 22 and a bearing 24 mounted within the housing 22 at a point which is a predetermined distance from the open end 26 of the spindle housing 22. The spindle housing 22 may be sized with respect to the bearing 24 such that the bearing 24 may simply be pressed into position within the housing 22 and maintained in this position by frictional forces. The spindle 14 extends through the spindle housing 22 and the bearing 24, and out of the open end 26 of the spindle housing 22. In order to protect the surrounding optical components as much possible from the adverse effects of any oil leakage from the bearing 24, the mirror support wheel 12 defines a generally annular counter bore 28 into which the open end of the cylindrical spindle housing 22 extends, thereby shielding the bearing 24 to a degree.

The mirror support wheel further defines a central spindle engaging portion 30 which is radially inward of the annular counter bore 28. The central spindle engaging portion 30 has an inner surface 32 facing the bearing 24 and spaced therefrom by a distance A. It has been found that if the surface 32 is close to the bearing 24, the rotation of the wheel 12 results in a Bernoulli effect reduction in air pressure in the region of the bearing. As a consequence, oil in the bearing 24 will tend to be sucked from the bearing. The oil may then migrate to other portions of the rotating wheel 12 and be spattered onto the system optics as the wheel rotates at relatively high speeds. To overcome this problem, the distance A is made to be sufficient to substantially reduce this Bernoulli effect pressure drop in the region within said spindle housing 22 adjacent the side of the bearing facing the inner surface 32. Preferably, the inner surface 32 of the central spindle engaging portion 30 of the mirror support wheel 12 is spaced from the bearing 24 by a distance of approximately 0.200 inches.

The open end 26 of the spindle housing 22 is spaced from the bottom 34 of the annular counter bore 28 by a distance B. If this distance is sufficiently small, a Bernoulli effect reduction in the air pressure in this gap is produced which may produce a reduction in the air pressure adjacent the bearing 24. To overcome this problem, the distance B is made to be sufficient to substantially reduce this Bernoulli effect pressure drop in the region within said spindle housing 22 adjacent the side of the bearing facing the inner surface 32. It is preferred that the open end 26 of the spindle housing 22 be spaced from the bottom 34 of the annular counter bore 28 by a distance of approximately 0.040 inches. Similarly, the side surface 36 of the counter bore 28 facing the outer surface 38 of the spindle housing is spaced from the outer surface 38 by a sufficient distance to substantially reduce the Bernoulli effect pressure drop in the region within the spindle housing 22. This distance C is preferably approximately 0.075 inches.

As illustrated in FIG. 2, the mirror support wheel defines one or more annular recesses 40 in the side surface 36 of the counter bore 28 facing the outer surface 38 of the spindle housing 22. These annular recesses define one or more labyrinth seals in conjunction with the outer surface 38 of the spindle housing 38. Although spaced from the surface 38 by approximately 0.075 inches, the labyrinth seals function effectively to trap a small quantity of lubricant which may inadvertently leak from the bearing. It will be seen, therefore, that the apparatus and method of the present invention provide an effective means for rotating one or more mirrors, while reducing the likelihood of a oil leaking from the bearings of the apparatus and degrading operation of the scanning system.

Having described the invention in detail and by reference to preferred embodiments thereof, it will be apparent that modifications and variations are possible without departing from the scope of the invention defined in the appended claims.

What is claimed is:

1. Apparatus for rotating one or more mirrors in a beam scanning system, comprising:
   a drive motor,
   a drive spindle, operatively connected to said drive motor, for rotation by said motor,
   a spindle support arrangement, including a generally cylindrical spindle housing and a bearing mounted within said housing a predetermined distance from an open end thereof, said spindle extending through said spindle housing and said bearing and out of said open end of said spindle housing, and
   a mirror support wheel mounted on said spindle for rotation therewith, said mirror support wheel defining a generally annular counter bore for receiving said open end of said spindle housing thereinto, said mirror support wheel further defining a central spindle engaging portion which is radially inward of said annular counter bore, said central spindle engaging portion having an inner surface facing said bearing and spaced therefrom by a distance which is sufficient to substantially reduce the Bernoulli effect pressure drop in the region within said spindle housing adjacent the side of said bearing facing said inner surface when said mirror support wheel is rotated by said spindle.

2. The apparatus of claim 1 in which said inner surface of said central spindle engaging portion of said mirror support wheel is spaced from said bearing by a distance of approximately 0.200 inches.

3. The apparatus of claim 1 in which said open end of said spindle housing is spaced from the bottom of said annular counter bore by a distance which is sufficient to substantially reduce the Bernoulli effect pressure drop in the region within said spindle housing adjacent the side of said bearing facing said inner surface when said mirror support wheel is rotated by said spindle.

4. The apparatus of claim 3 in which the open end of said spindle housing is spaced from the bottom of said annular counter bore by approximately 0.040 inches.

5. The apparatus of claim 1 in which said mirror support wheel defines one or more annular recesses in the side surface of said counter bore facing the outer surface of said spindle housing, whereby said one or more annular recesses define one or more labyrinth seals in conjunction with said outer surface of said spindle housing.

6. The apparatus of claim 1 in which the side surface of said counter bore facing the outer surface of said spindle housing is spaced therefrom by a distance which is sufficient to substantially reduce the Bernoulli effect pressure drop in the region within said spindle housing adjacent the side of said bearing facing said inner surface when said mirror support wheel is rotated by said spindle.

7. The apparatus of claim 6 in which the side surface of said counter bore facing the outer surface of said spindle housing is spaced therefrom by approximately 0.075 inches.

8. A method for rotating one or more mirrors in a beam scanning system, comprising the steps of:
   providing a drive spindle,
   supporting said drive spindle by means of a spindle support arrangement, including a generally cylindrical spindle housing and a bearing mounted within said housing a predetermined distance from an open end thereof, said spindle extending through said spindle housing and said bearing and out of said open end of said spindle housing,
   mounting a mirror support wheel on said spindle for rotation therewith, said mirror support wheel defining a generally annular counter bore for receiving said open end of said spindle housing thereinto, said mirror support wheel further defining a central spindle engaging portion which is radially inward of said annular counter bore, said central spindle engaging portion having an inner surface facing said bearing and spaced therefrom by a distance which is sufficient to substantially reduce the Bernoulli effect pressure drop in the region within said spindle housing adjacent the side of said bearing facing said inner surface which would otherwise be produced when said mirror support wheel is rotated by said spindle,
   mounting a plurality of mirrors on said mirror support wheel, and
   rotating said drive spindle and said mirror support wheel.

9. The method of claim 8 in which said inner surface of said central spindle engaging portion of said mirror support wheel is spaced from said bearing by a distance of approximately 0.200 inches.

10. The method of claim 8 in which said open end of said spindle housing is spaced from the bottom of said annular counter bore by a distance which is sufficient to substantially reduce the Bernoulli effect pressure drop in the region within said spindle housing adjacent the side of said bearing facing said inner surface when said mirror support wheel is rotated by said spindle.

11. The method of claim 10 in which the open end of said spindle housing is spaced from the bottom of said annular counter bore by approximately 0.040 inches.

12. The method of claim 8 in which said mirror support wheel defines one or more annular recesses in the side surface of said counter bore facing the outer surface of said spindle housing, whereby said one or more annular recesses define one or more labyrinth seals in conjunction with said outer surface of said spindle housing.

13. The method of claim 8 in which the side surface of said counter bore facing the outer surface of said spindle housing is spaced therefrom by a distance which is sufficient to substantially reduce the Bernoulli effect pressure drop in the region within said spindle housing adjacent the side of said bearing facing said inner surface when said mirror support wheel is rotated by said spindle.

14. The method of claim 13 in which the side surface of said counter bore facing the outer surface of said spindle housing is spaced therefrom by approximately 0.075 inches.

* * * * *